United States Patent
Yoshikawa et al.

(10) Patent No.: US 9,033,096 B2
(45) Date of Patent: May 19, 2015

(54) POWER STEERING DEVICE

(75) Inventors: Shinraku Yoshikawa, Minokamo (JP);
Katsumi Shimoda, Kani (JP); Tetsuro Shimizu, Komaki (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/006,075

(22) PCT Filed: Feb. 14, 2012

(86) PCT No.: PCT/JP2012/053359
§ 371 (c)(1),
(2), (4) Date: Sep. 18, 2013

(87) PCT Pub. No.: WO2012/127935
PCT Pub. Date: Sep. 27, 2012

(65) Prior Publication Data
US 2014/0008142 A1  Jan. 9, 2014

(30) Foreign Application Priority Data
Mar. 22, 2011 (JP) ................. 2011-062369

(51) Int. Cl.
B62D 5/04 (2006.01)
F16H 55/24 (2006.01)
(Continued)

(52) U.S. Cl.
CPC ............ *B62D 5/0454* (2013.01); *B62D 5/0409* (2013.01); *F16H 1/16* (2013.01); *F16H 2057/0213* (2013.01); *F16H 55/24* (2013.01)

(58) Field of Classification Search
CPC ..... B62D 5/049; B62D 5/0454; B62D 5/0454
USPC .................................... 180/443, 444
See application file for complete search history.

(56) References Cited

U.S. PATENT DOCUMENTS 5,044,454 A    9/1991  Kanazawa et al.
8,443,929 B2 *  5/2013  Suzuki et al. .................. 180/444
(Continued)

FOREIGN PATENT DOCUMENTS

JP     3-112784 A    5/1991
JP   2003-154945 A   5/2003
(Continued)

OTHER PUBLICATIONS

International Search Report and Written Opinion corresponding to PCT/JP2012/053359, dated May 22, 2012.

*Primary Examiner* — Kevin Hurley
(74) *Attorney, Agent, or Firm* — Lowe Hauptman & Ham, LLP

(57) ABSTRACT

A power steering device includes a first bearing and a second bearing that rotatably support the base-end side and the tip-end side of a worm shaft, a biasing member that biases the outer circumferential surface of the second bearing, and an elastic member that is arranged between the inner circumferential surface of a gear case and the outer circumferential surface of the second bearing. The inner circumferential surface of the gear case is formed such that the second bearing can move towards a worm wheel by the biasing force of the biasing member, the inner circumferential surface of the gear case is provided with a ring-like groove that houses the elastic member, and the center of the ring-like groove is offset towards the worm wheel side from the center axis of the worm shaft when the first bearing and the second bearing are in a coaxial state.

11 Claims, 3 Drawing Sheets

(51) Int. Cl.
*F16H 1/16* (2006.01)
*F16H 57/021* (2012.01)

(56) References Cited

U.S. PATENT DOCUMENTS

| | | | |
|---|---|---|---|
| 8,505,675 B2 * | 8/2013 | Suzuki et al. | 180/444 |
| 8,602,154 B2 * | 12/2013 | Iwasa et al. | 180/444 |
| 2007/0193819 A1 * | 8/2007 | Iwasa et al. | 180/444 |
| 2007/0205039 A1 | 9/2007 | Imagaki et al. | |

FOREIGN PATENT DOCUMENTS

| | | |
|---|---|---|
| JP | 2004-249844 A | 9/2004 |
| JP | 2006-088775 A | 4/2006 |
| JP | 2007-216729 A | 8/2007 |
| JP | 2008-095839 A | 4/2008 |
| JP | 2010-116090 A | 5/2010 |

* cited by examiner

US 9,033,096 B2

POWER STEERING DEVICE

RELATED APPLICATIONS

The present application is a National Phase of International Application Number PCT/JP2012/053359, filed Feb. 14, 2012, and claims priority from Japanese Application Number 2011-062369, filed Mar. 22, 2011.

TECHNICAL FIELD

This invention relates to a power steering device.

BACKGROUND ART

In a conventional power steering device, as disclosed in JP3-112784A, there is a known device that adjusts a gap between gears of a worm wheel and of a worm shaft by using a spring to bias a bearing supporting the worm shaft that engages with the worm wheel provided on a steering shaft.

SUMMARY OF INVENTION

With the power steering device disclosed in JP3-112784A, when a load exceeding the biasing force of the spring is applied from a wheel side, the spring is compressed to cause the bearing to hit an inner circumference of a housing, thus making a metal touching noise.

This invention has been designed in consideration of this problem, and an object thereof is to provide a power steering device that is capable of reducing a metal touching noise made between a bearing and a gear case.

According to one aspect of this invention, a power steering device that assists a steering force applied to a steering wheel by a driver is provided. The power steering device comprises a worm wheel that is provided on a steering shaft linked to the steering wheel, a worm shaft that is engaged with the worm wheel and rotated by driving of an electric motor, a first bearing that rotatably supports a base-end side of the worm shaft, a second bearing that rotatably supports a tip-end side of the worm shaft, a gear case that houses the worm shaft, a biasing member that biases the worm shaft towards the worm wheel by exerting a biasing force on an outer circumferential surface of the second bearing, and an elastic member that is arranged between an inner circumferential surface of the gear case and the outer circumferential surface of the second bearing. The inner circumferential surface of the gear case that surrounds the outer circumferential surface of the second bearing is formed such that the second bearing can move towards the worm wheel by the biasing force of the biasing member The inner circumferential surface of the gear case is provided with a ring-like groove for housing the elastic member, and a center of the ring-like groove is provided so as to be offset towards the worm wheel side from a center axis of the worm shaft when the first bearing and the second bearing are in a coaxial state.

Embodiments of the present invention and advantages thereof are described in detail below with reference to the accompanying drawings.

DESCRIPTION OF EMBODIMENT

A power steering device 100 according to an embodiment of this invention will be described with reference to the drawings.

The power steering device 100 is a device that is installed on a vehicle and assists a steering force applied to a steering wheel by a driver.

Figures 1A, 1B:
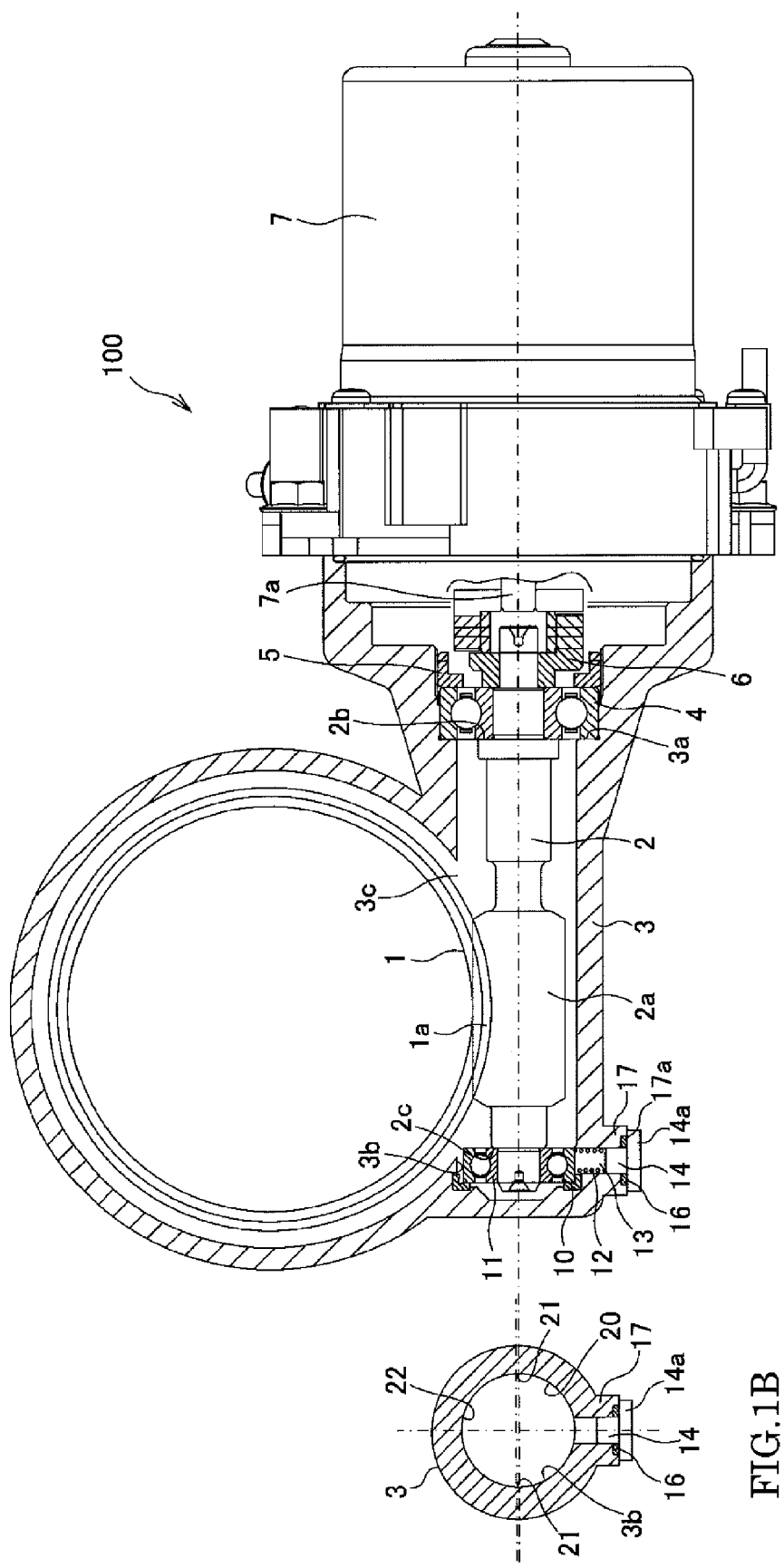
FIG. 1 (A) is a sectional view showing a power steering device according to an embodiment of this invention. (B) is a sectional view of a portion of a gear case in which a second bearing is housed.

As shown in FIG. 1, the power steering device 100 includes a worm wheel 1 that is provided on a steering shaft linked to the steering wheel and a worm shaft 2 that is connected to, at the one end thereof, an output shaft 7a of an electric motor 7 and that engages with the worm wheel 1. As the electric motor 7 is driven, the worm shaft 2 is rotated and the rotation of the worm shaft 2 is transferred to the worm wheel 1 in such a manner that the rotation speed is reduced. The worm wheel 1 and the worm shaft 2 form a worm speed reducer.

The torque output from the electric motor 7 is transferred from the worm shaft 2 to the worm wheel 1 and then exerted on a steering shaft as an assist torque. The torque output from the electric motor 7 corresponds to a steering torque, which can be calculated on the basis of the amount of torsional twist of a torsion bar that is twisted by a relative rotation between an input shaft and the output shaft forming the steering shaft.

The worm shaft 2 is housed in a metallic gear case 3. A part of the worm shaft 2 is provided with a gear portion 2a that engages with a gear portion 1a of the worm wheel 1. An opening 3c is formed on the inner circumferential surface of the gear case 3 at the position corresponding to the gear portion 2a. The gear portion 2a of the worm shaft 2 and the gear portion 1a of the worm wheel 1 are engaged through the opening 3c.

The base-end side, that is, the electric motor 7 side, of the worm shaft 2 is rotatably supported by a first bearing 4. The first bearing 4 has balls interposed between an annular inner ring and an annular outer ring. The outer ring of the first bearing 4 is sandwiched and held between a stepped portion 3a formed on the gear case 3 and a locknut 5. The inner ring of the first bearing 4 is sandwiched and held between a stepped portion 2b of the worm shaft 2 and a joint 6 that is press-fitted to the outer circumference of the worm shaft 2. With such a configuration, movement of the worm shaft 2 in the axial direction is restricted.

Figure 2:
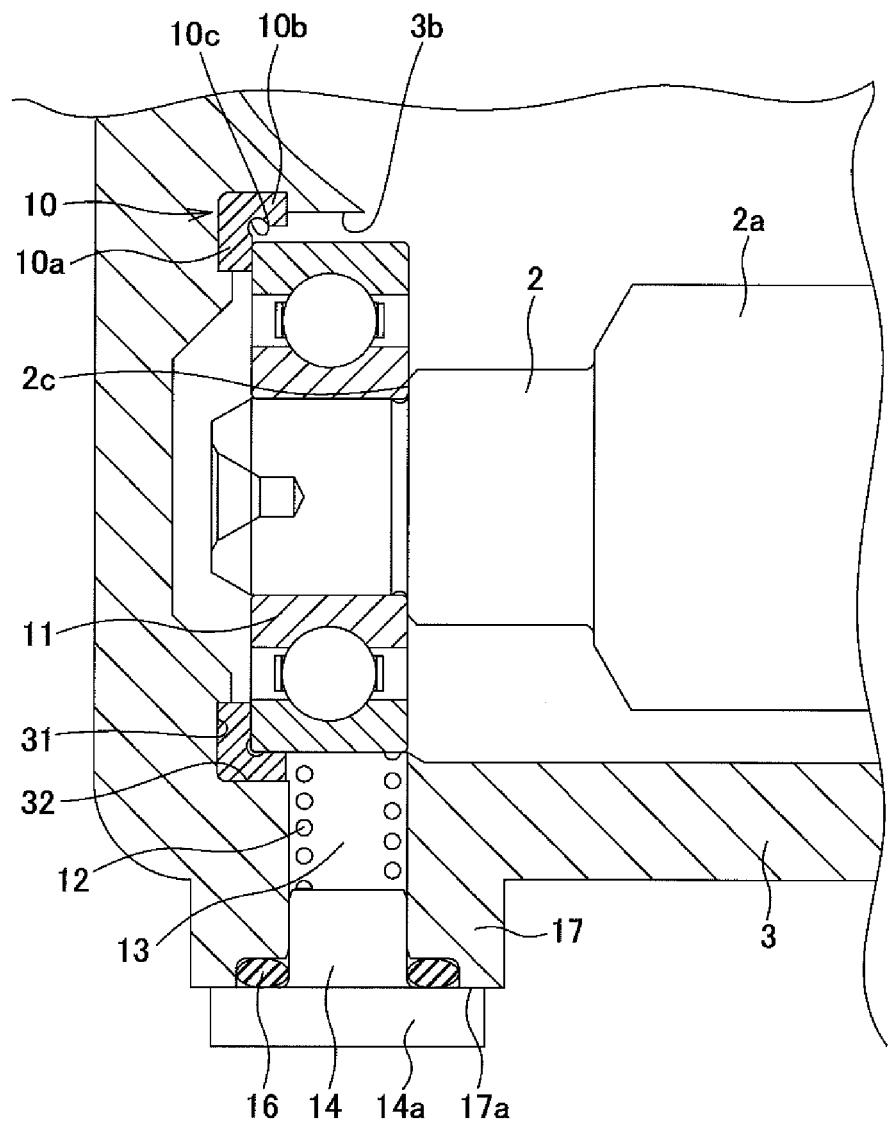
FIG. 2 is a partially enlarged view of FIG. 1(A).

As shown in FIG. 2, the tip-end side of the worm shaft 2 is rotatably supported by a second bearing 11 that is housed in a bottom portion of the gear case 3 through an L-shaped ring 10 serving as an annular elastic member having an L-shaped section. The second bearing 11 has balls interposed between a ring-like inner ring and an outer ring. A stepped portion 2c that is formed in the vicinity of the tip end portion of the worm shaft 2 is latched to the inner ring of the second bearing 11.

Because the second bearing 11 is pressed against the stepped portion 2c of the worm shaft 2 by the biasing force of the L-shaped ring 10, rattling in the axial direction of the second bearing 11 is reduced. In other words, the L-shaped ring 10 is compressed between the bottom portion of the gear case 3 and the bottom portion of the second bearing 11, and therefore, the second bearing 11 is pressed in the axial direction.

A flange portion 17 having a flat end surface 17a is formed at the end portion side of the outer circumferential surface of the gear case 3 in a projected manner. A through hole 13 is formed on the flange portion 17, and an opening of the through hole 13 that opens at the inner circumferential surface of the gear case 3 is formed so as to face against the outer circumferential surface of the second bearing 11. A coil spring 12 serving as a biasing member is housed in the through hole 13, and an opening of the through hole 13 that opens at the end surface 17a of the flange portion 17 is closed by a plug 14 having a head portion 14a.

An O-ring 16 is interposed between the end surface 17a of the flange portion 17 and the head portion 14a of the plug 14, and the plug 14 is press-fitted until the O-ring 16 is pressed against the end surface 17a of the flange portion 17 by the head portion 14a. Instead of press-fitting the plug 14 into the through hole 13, a hexagon headed bolt may be screwed and fastened into the through hole 13.

The coil spring 12 is housed in the through hole 13 in a compressed manner between the tip end surface of the plug 14 and the outer circumferential surface of the second bearing 11 and biases the second bearing 11 in the direction that reduces the gap between the gear portion 2a of the worm shaft 2 and the gear portion 1a of the worm wheel 1. In other words, the coil spring 12 biases the worm shaft 2 towards the worm wheel 1 via the second bearing 11.

An inner circumferential surface 3b of the gear case 3 that surrounds the outer circumferential surface of the second bearing 11 is formed such that the second bearing 11 can be moved towards the worm wheel 1 by the biasing force of the coil spring 12. Specifically, the inner circumferential surface 3b is formed so as to have an elongated hole shape. In the following, the elongated hole of the inner circumferential surface 3b will be described in detail with reference to FIG. 3.

The inner circumferential surface 3b is formed so as to have an elongated hole shape that consists of a first semi-arc shaped surface 20 that has the center at a center axis X of the worm shaft 2 when the first bearing 4 and the second bearing 11 are in a coaxial state, a pair of flat surfaces 21 that are connected to both ends of the first semi-arc shaped surface 20 and extend in parallel with the biasing direction of the coil spring 12, and a second semi-arc shaped surface 22 that is connected to the flat surfaces 21 and is symmetrical relative to the first semi-arc shaped surface 20 through the flat surfaces 21. As described above, the inner circumferential surface 3b is formed such that the second bearing 11 can be moved from the coaxial state with the first bearing 4 towards the worm wheel 1 by the biasing force of the coil spring 12. The first semi-arc shaped surface 20 of the inner circumferential surface 3b may also be formed such that the center thereof is offset from the center axis X towards the coil spring 12 side.

Next, the L-shaped ring 10 will be described in detail.

As shown in FIG. 2, the L-shaped ring 10 includes a ring-like first elastic portion 10a that is arranged between the bottom portion of the gear case 3 and the bottom portion of the second bearing 11 and a ring-like second elastic portion 10b that is arranged between the inner circumferential surface 3b of the gear case 3 and the outer circumferential surface of the second bearing 11. A first ring-like groove 31 for housing the first elastic portion 10a is formed on the bottom portion of the gear case 3, and a second ring-like groove 32 for housing the second elastic portion 10b is formed on the inner circumferential surface 3b of the gear case 3. Because the L-shaped ring 10 is housed in the first ring-like groove 31 and the second ring-like groove 32, positional deviation of the L-shaped ring 10 within the gear case 3 is prevented.

The depth dimensions of the first ring-like groove 31 and the second ring-like groove 32 are smaller compared with the thicknesses of the first elastic portion 10a and the second elastic portion 10b. Therefore, the first elastic portion 10a and the second elastic portion 10b respectively protrude from the bottom portion of the gear case 3 and the inner circumferential surface 3b by a predetermined height in a state that they are housed in the first ring-like groove 31 and the second ring-like groove 32. These projected portions are brought into contact with the second bearing 11, thereby preventing contact between the second bearing 11 and the bottom portion and the inner circumferential surface 3b of the gear case 3.

The boundary between the first elastic portion 10a and the second elastic portion 10b is provided with a groove portion 10c that allows the corner portion of the outer ring of the second bearing 11 to escape. The groove portion 10c also has an effect of absorbing deformation of the L-shaped ring 10.

Figure 3:
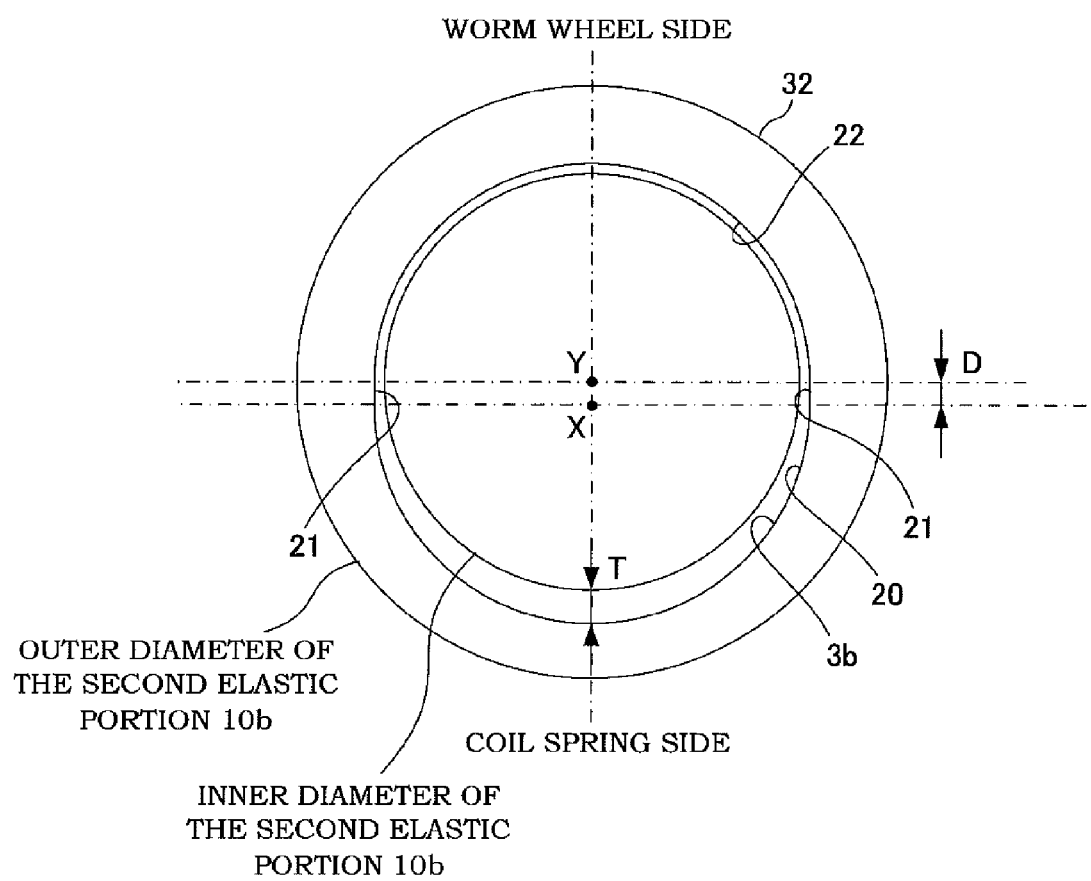
FIG. 3 is a schematic view showing a positional relationship between a ring-like groove and an elongated hole of a gear case.

As shown in FIG. 3, the second ring-like groove 32 is provided such that the center Y thereof is offset from the center axis X of the worm shaft 2 towards the worm wheel 1 side by a predetermined length D. Specifically, the offset length D is set so as to have the same length as that of the flat surfaces 21 of the elongated hole of the inner circumferential surface 3b. In other words, the center Y of the second ring-like groove 32 is set at the same position as the center of the second semi-arc shaped surface 22 of the elongated hole.

By doing so, as shown in FIG. 3, when the second bearing 11 is pressed by the biasing force of the coil spring 12 and is positioned in a coaxial state with the center Y of the second ring-like groove 32, the second elastic portion 10b has a compressible margin having the length T in the direction that the second bearing 11 moves against the biasing force of the coil spring 12.

Next, assembly of the worm shaft 2 into the gear case 3 and the function of the L-shaped ring 10 will be described.

The L-shaped ring 10 is first housed into the first ring-like groove 31 and the second ring-like groove 32 of the gear case 3.

Next, the second bearing 11 is inserted into the gear case 3 to insert it into the inner circumference of the second elastic portion 10b of the L-shaped ring 10.

Next, the coil spring 12 is housed in the through hole 13, the plug 14 is press-fitted into the through hole 13, and the coil spring 12 is compressed between the outer circumferential surface of the second bearing 11 and the plug 14.

Finally, the worm shaft 2 is inserted into the gear case 3 to insert the tip end portion of the worm shaft 2 into the inner circumference of the inner ring of the second bearing 11. Thereby, assembly of the worm shaft 2 to the gear case 3 is completed.

At the time of completion of the assembly of the worm shaft 2 to the gear case 3, the second bearing 11 is biased towards the worm wheel 1 side by the biasing force of the coil spring 12, and a state in which a backlash is not present is achieved. In this state, the center of the second bearing 11 is slightly offset from the center axis X towards the worm wheel 1 side. Specifically, the center of the second bearing 11 is positioned between the center axis X and the center Y (see FIG. 3). Therefore, the worm shaft 2 is slightly inclined by the biasing force of the coil spring 12.

As the power steering device 100 is driven, abrasions of the gear portion 2a of the worm shaft 2 and the gear portion 1a of the worm wheel 1 advance. However, in such a case, because the second bearing 11 moves within the elongated hole of the gear case 3 by the biasing force of the coil spring 12, the backlash between the gear portion 2a of the worm shaft 2 and the gear portion 1a of the worm wheel 1 is reduced. Therefore, as the abrasions of the gear portion 2a of the worm shaft 2 and the gear portion 1a of the worm wheel 1 advance with the driving of the power steering device 100, the compressible margin of the second elastic portion 10b gradually becomes larger.

In such a situation, when a load exceeding the biasing force of the coil spring 12 is applied from a wheel side, the second bearing 11 moves vigorously against the biasing force of the coil spring 12. However, because the second bearing 11 moves within the elongated hole while compressing the compressible margin of the second elastic portion 10b, the second bearing 11 is prevented from vigorously hitting the inner circumferential surface 3b of the gear case 3. Therefore, it is possible to reduce generation of a metal touching noise caused when the second bearing 11 hits the inner circumferential surface 3b of the gear case 3.

In addition, the first elastic portion 10a of the L-shaped ring 10 is compressed between the bottom portion of the gear case 3 and the bottom portion of the second bearing 11 and presses the second bearing 11 towards the stepped portion 2c of the worm shaft 2. Thereby, the rattling of the second bearing 11 in the axial direction is reduced.

A modification of the above-mentioned embodiment will be described below.

In the above-mentioned embodiment, a description is given of the case where the L-shaped ring 10 in which the first elastic portion 10a that is arranged between the bottom portion of the gear case 3 and the bottom portion of the second bearing 11 and the second elastic portion 10b that is arranged between the inner circumferential surface 3b of the gear case 3 and the outer circumferential surface of the second bearing 11 are integral to each other is used. However, instead of employing this configuration, the similar effects and advantages as those in the above-mentioned embodiment are afforded even if the first elastic portion 10a and the second elastic portion 10b are configured by separate elastic members, for example O-rings.

Embodiments of this invention were described above, but the above embodiments are merely examples of applications of this invention, and the technical scope of this invention is not limited to the specific constitutions of the above embodiments.

This application claims priority based on Japanese Patent Application No. 2011-62369 filed with the Japan Patent Office on Mar. 22, 2011, the entire contents of which are incorporated into this specification.

INDUSTRIAL APPLICABILITY

The present invention can be applied to a power steering device that assists a steering force applied to a steering wheel by a driver.

The invention claimed is:

1. A power steering device that assists a steering force applied to a steering wheel by a driver comprising:
a worm wheel that is provided on a steering shaft linked to the steering wheel;
a worm shaft that is engaged with the worm wheel and rotated by driving of an electric motor;
a first bearing that rotatably supports a base-end side of the worm shaft;
a second bearing that rotatably supports a tip-end side of the worm shaft;
a gear case that houses the worm shaft;
a biasing member that biases the worm shaft towards the worm wheel by exerting a biasing force on an outer circumferential surface of the second bearing; and
an elastic member that is arranged between an inner circumferential surface of the gear case and the outer circumferential surface of the second bearing,
wherein the inner circumferential surface of the gear case that surrounds the outer circumferential surface of the second bearing is formed such that the second bearing can move towards the worm wheel by the biasing force of the biasing member, and
wherein the inner circumferential surface of the gear case is provided with a ring-like groove for housing the elastic member, and a center of the ring-like groove is provided so as to be offset towards the worm wheel side from a center axis of the worm shaft when the first bearing and the second bearing are in a coaxial state.

2. A power steering device according to claim 1, wherein the elastic member comprises a ring-like first elastic portion that is arranged between a bottom portion of the gear case and a bottom portion of the second bearing and a ring-like second elastic portion that is arranged between the inner circumferential surface of the gear case and the outer circumferential surface of the second bearing.

3. A power steering device according to claim 1, wherein the inner circumferential surface of the gear case consists of a first semi-arc shaped surface, a pair of flat surfaces that extend in parallel with the biasing direction of the biasing member, and a second semi-arc shaped surface that is symmetrical relative to the first semi-arc shaped surface through the flat surfaces, and
wherein the center of the ring-like groove is substantially the same as a center of the second semi-arc shaped surface.

4. A power steering device according to claim 2, wherein the second bearing is biased towards the worm wheel by the biasing force of the biasing member and the second elastic portion applied to the outer circumferential surface thereof.

5. A power steering device according to claim 1, wherein a depth dimension of the ring-like groove is smaller compared with a thickness of the elastic member.

6. A power steering device according to claim 1, wherein when the second bearing is in the coaxial state with the first bearing, there is a space between the outer circumferential surface of the second bearing and an inner circumferential surface of the elastic member in a direction of movement of the second bearing towards the worm wheel by the biasing force of the biasing member.

7. A power steering device according to claim 1, wherein the biasing member is a coil spring, and the elastic member is an elastic ring.

8. A power steering device according to claim 5, wherein the elastic member protrudes from the inner circumferential surface of the gear case by a predetermined height in a state in which the elastic member is housed in the ring-like groove, and
a thickness of an inner surface of the elastic member is greater on the worm wheel side than the thickness on a non-worm wheel side.

9. A power steering device according to claim 2, wherein the gear case includes a cylindrical body that is provided with an opening formed on the inner circumferential surface thereof at a position corresponding to a gear portion of the worm shaft, and
a body of the gear case and the bottom portion of the gear case are formed integrally.

10. A power steering device according to claim 9, wherein a ring-like groove for housing the first elastic portion is formed on the bottom portion of the gear case.

11. A power steering device according to claim 2, wherein the elastic member is an L-shaped ring having an L-shaped section including the first elastic portion and the second elastic portion, and
a boundary between the first elastic portion and the second elastic portion is provided with a groove portion.

* * * * *